United States Patent [19]

Kusanagi et al.

[11] Patent Number: 4,968,551

[45] Date of Patent: Nov. 6, 1990

[54] ACOUSTIC VIBRATOR MEMBER AND METHOD OF MANUFACTURING

[75] Inventors: Wataru Kusanagi; Minoru Ito, both of Yamagata, Japan

[73] Assignees: Pioneer Electronic Corporation, Tokyo; Mogami Denki Kabushiki Kaisha, Yamagata, both of Japan

[21] Appl. No.: 248,481

[22] Filed: Sep. 23, 1988

[30] Foreign Application Priority Data

Mar. 3, 1988 [JP] Japan .................................. 63-50415

[51] Int. Cl.⁵ .............................................. B32B 3/02
[52] U.S. Cl. .................... 428/195; 428/206; 428/215; 428/323; 428/324; 428/515; 428/516; 428/332; 428/337; 428/339; 156/60
[58] Field of Search ............... 428/195, 206, 215, 323, 428/324, 516, 515, 332, 337, 339; 156/60

[56] References Cited

U.S. PATENT DOCUMENTS

| 3,983,285 | 9/1976 | Riboulet et al. | 428/212 |
| 4,412,103 | 10/1983 | Fujii et al. | 179/115.5 R |
| 4,532,099 | 7/1985 | Kaji | 428/229 |

FOREIGN PATENT DOCUMENTS 57-154994 9/1982 Japan .
59-135996 8/1984 Japan .

Primary Examiner—Patrick Ryan
Attorney, Agent, or Firm—Foley & Lardner, Schwartz, Jeffery, Schwaab, Mack, Blumenthal & Evans

[57] ABSTRACT

An acoustic vibrator member includes a substrate sheet made of propylene resin with solid microparticles dispersed therein and a film made of propylene resin laminated on the substrate sheet. The film carries a printed visible pattern. The vibrator member is freely colorable while retaining suitable physical properties.

19 Claims, 3 Drawing Sheets

ACOUSTIC VIBRATOR MEMBER AND METHOD OF MANUFACTURING

BACKGROUND OF THE INVENTION

1. Field of the invention

The present invention relates to an acoustic vibrator member used in a loudspeaker and the like, and to a method of manufacturing the vibrator member.

2. Description of the Prior Art

It is usually required that an acoustic vibrator member be lightweight and have a low density and a high rigidness. It is also required that the vibrator member have a pertinent large internal loss and that the propagation velocity $pE/V$ of the vibrator member be large in Which E represents the Young's modulus and $V$ represents the density. A conventional vibrator member is made of a material such as paper, synthetic resin and metal.

Since the vibrator member made of paper generally has a large internal loss, a loudspeaker utilizing the paper vibrator member has a relatively constant responsiveness in the sound pressure vs. frequency characteristic. The rigidness of the paper vibrator member is relatively low. The paper vibrator member generates partial vibrations in a low frequency band of the sound pressure vs. frequency characteristic, thereby to deteriorating the properties of transient and distortion of the loudspeaker thereof. The paper vibrator member is too hygroscopic to cause changes of the tome quality of the sound radiated from the loudspeaker using it. The tone quality of the loudspeaker readily suffers from the deterioration caused by the secular changes.

The vibrator member made of metal has a high rigidness and a low internal loss. The sound pressure vs. frequency characteristic of a loudspeaker utilizing the metallic vibrator member has a peak of resonance at a high frequency part thereof because of the low internal loss thereof. It is however difficult to damp the peak of resonance of the metallic vibrator member. When the peak of the resonance is moved away from the audio frequencies, the metallic vibrator member is suitable for loudspeakers for tweeter and midrange in high and middle acoustic frequency ranges, but not for a woofer for the lower frequency ranges.

The vibrator member made of a synthetic resin such as a thermal plastic resin has a low hygroscopicity and a high internal loss. The synthetic resin vibrator members are suitable for various loudspeakers. The physical properties of the loudspeakers using the synthetic resin vibrator members are stable during and after the manufacture thereof.

The synthetic resin vibrator member has a low rigidness similar to the paper vibrator member. A composite vibrator member mainly made of synthetic resin has recently been developed in order to improve the rigidness of the synthetic resin vibrator member. The materials of the composite vibrator member comprises the synthetic resin and fillers such as carbon fiber, graphite powder and whisker which are filled and suspended in the synthetic resin. In this case, long carbon fibers are used as the filler. The mica powder consisting of microparticles each having a large aspect ratio is used as the filler.

It is difficult to obtain a composite vibrator member having good color tones and rich color variations through the conventional method of forming such as injection molding, vacuum forming and compression molding, since the fillers are possibly exposed to the surface of the composite vibrator member. The manufacture of a composite vibrator member is restricted in design even with a coating of coloring on the surface thereof resulting in an unsatisfactory composite vibrator member.

SUMMARY OF THE INVENTION

The object of the invention is to provide a composite vibrator member being freely colorable and having a glossy surface and a method for manufacturing the same.

A vibrator member according to a first aspect of the present invention comprises: a substrate sheet made of a propylene resin With solid microparticles dispersed therein: and a film made of a propylene resin and laminated on said substrate sheet, said film carrying a printed visible pattern.

A method of manufacturing a vibrator member according to a second aspect to the present invention comprises the steps of: forming a continuous substrate sheet from a propylene resin with solid microparticles dispersed therein; forming a continuous film made of a propylene resin; printing a visible pattern on at least one side surface of said continuous film; laminating the printed film onto said substrate sheet; and forming the laminated sheet of said substrate and said film into a predetermined shape of a vibrator member.

DESCRIPTION OF THE PREFERRED EMBODIMENTS

The embodiments according to the present invention will be explained while referring to the accompanying drawings.

(1) Substrate sheet:

The continuous substrate sheet is produced in the following manner. Pellets of polypropylene are first prepared as a propylene resin. The pellets are thrown into a hopper of a mixing and kneading machine together with suitable additives for making stable a resultant mixture. Solid microparticles such as carbon fibers, graphite powders, mica powders and whiskers are also thrown into the hopper of the mixing and kneading machine. The microparticles are particles of the solid substances on a minute scale as revealed by a microscope or other means. These materials are mixed and kneaded in the machine to produce a polypropylene material in which the solid microparticles are dispersed. The obtained dough of the polypropylene material is processed to a calender machine which expands it and forms a continuous sheet as a substrate sheet. In the calender machine, the continuous substrate sheet is formed while being heated at a temperature with in a range of 230° through 260° C. through a plurality of pressing rollers. The thickness of this sheet is thereafter freely adjusted by passing it through a plurality of cooling rollers to a desired thickness.

The substrate sheet may be made of a propylene copolymer such as ethylene-propylene copolymer instead of polypropylene. Another olefins-propylene copolymer may also be used.

(2) Film made of propylene resin:

A film made of polypropylene is prepared. For example, the so-called "OPP film" is used which is a polypropylene film expanded in a biaxial direction thereof. The thickness of the propylene film is adjusted preferably within 20 through 300 $\mu$m. It is difficult in the manufacturing to treat the propylene film whose thickness is less than 20 $\mu$m. The vibrator member including a 300 $\mu$m thickness of the propylene film becomes too heavy to obtain a suitable sensitivity for a loudspeaker. The surface of the OPP film may be polarized by the corona discharge treatment before printing, if required.

A visible pattern consisting lines and/or colored region which may be partly gradated is formed on the OPP film. For example, a network pattern of honeycomb is printed by gravure printing on at least one side surface of the OPP film. The OPP film may be colored per se by a dye so as to change the colored region. The OPP film may have embosses thereon for the preparing the visible pattern.

Figure 4A:
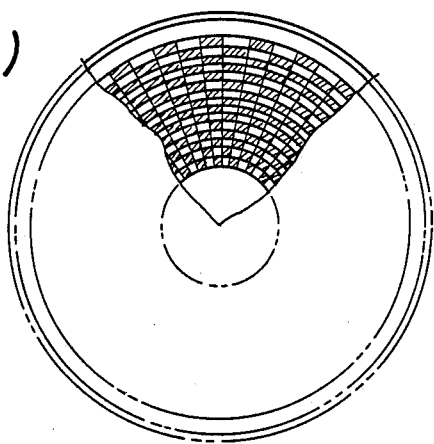
FIGS. 4a, 4b and 4c are partial front views of vibrator members according to the present invention each showing a visible pattern formed on the films laminated on the substrate.
Figure 4B:
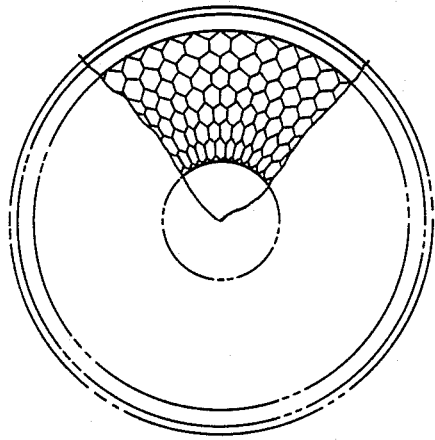
Figure 4C:
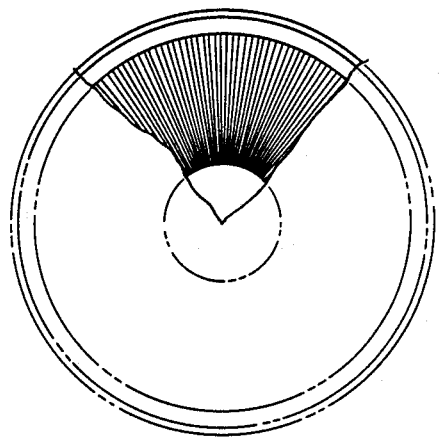

The film of propylene resin may be formed of a propylene copolymer such as an ethylene-propylene copolymer. Another olefins-propylene copolymer may also be used for the film. Letterpress printing and planography painting may be used in this printing step. The visible pattern may be printed as shown in FIG. 4. FIG. 4a shows a check pattern printed on the front face of the cone-shaped vibrator member. FIG. 4b shows a honeycomb pattern printed on the same. FIG. 4c shows a hair line pattern printed on the same.

Figure 1:
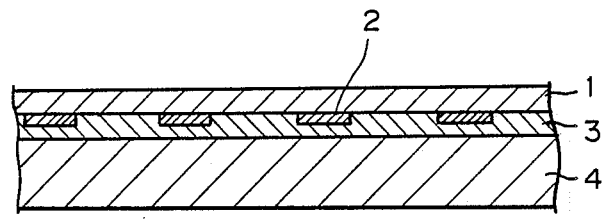
FIG. 1 is an enlarged partial cross sectional view of the vibrator member according to the present invention.

(3) Lamination of the propylene resin film and the substrate sheet:

As shown in FIG. 1, urethane adhesive 3 is coated on the printed surface of the OPP film 1 which carries ink layers 2 a thickness of which is a few micron meters. The printed surface coated with the urethane adhesive 3 of the OPP film is, as a whole, contacted and sticked onto the continuous substrate sheet 4 between compressing rollers (not shown) under the pertinent compressing conditions. The surface of the OPP film on which the visible pattern is printed may be polarized again by corona discharge treatment before the lamination, if required. In this way, the laminated sheet of the OPP film and the substrate sheet is obtained.

(4) Formation of the laminated sheet into a vibrator member:

The laminated sheet of the OPP film and the substrate sheet is heated above the softening temperature thereof and formed into a desired shape of a vibrator member such as an opening cone, dome or flat plate by means of a die through the method of forming such as vacuum forming, compression molding or heating die molding. The thickness of the resultant vibrator member is adjusted preferably within 0.1 through 1.0 mm on the whole. When the thickness of the vibrator member is less than 0.1 mm, a sufficient rigidness thereof for a loudspeaker is not obtained. The vibrator member becomes too heavy to obtain a suitable sensitivity for the loudspeaker when it's thickness is more than 1.0 mm.

EXAMPLES

In order to confirm the performance of the embodiments, examples of cone-shaped and center cap vibrator members made of laminated sheets were manufactured in accordance with the above mentioned process. Following combinations A through C of the substrate sheets materials and the OPP films were used as materials. The following sheet materials D through G were also utilized for making conventional vibrator members. In this way, the cone-shaped and center cap vibrator members A through G were manufactured.

A:
| | |
|---|---|
| Substrate sheet | Sample substance of polypropylene (The thickness is 0.40 mm.) |
| Film | OPP film (The thickness is 60 $\mu$m.) |

B:
| | |
|---|---|
| Substrate sheet | Composition mainly comprising polypropylene including mica powders 30 parts by weight which is dispersed therein. (The thickness is 0.40 mm.) |
| Film | OPP film (The thickness is 60 $\mu$m.) |

C:
| | |
|---|---|
| Substrate sheet | Composition mainly comprising polypropylene including graphite powders 30 parts by weight which is dispersed therein. (The thickness is 0.40 mm.) |
| Film | OPP film (The thickness is 60 $\mu$m.) |

D:
| | |
|---|---|
| Sheet | Composition mainly comprising polypropylene including mica powders 30 parts by weight which is dispersed therein. (The thickness is 0.46 mm.) |

E:
| | |
|---|---|
| Sheet | Composition mainly comprising polypropylene including graphite powders 30 parts by weight which is dispersed therein. (The thickness is 0.46 mm.) |

F:
| | |
|---|---|
| Sheet | Simple substance of polypropylene (The thickness is 0.46 mm.) |

G:
| | |
|---|---|
| Sheet | Paper (The thickness is 0.46 mm.) |

The vibrator members made of the laminations A, B and C showed the better glossiness on the surface thereof than that of vibrator members D, E and G. The vibrator members A, B and C were hardly influenced in the physical properties by laminating the OPP film onto the substrate sheet in comparison with the properties of the conventional vibrator member D through G, as shown in the following Table.

TABLE

| | Density (g/cm$^3$) | Young's modulus (dyne/cm$^2$) | Internal loss tan $\delta$ ($\times 10^{-2}$) | Propagation velocity ($\times 10^5$ cm/sec.) |
|---|---|---|---|---|
| A | 0.90 | 1.8 | 9.0 | 1.8 |
| B | 1.08 | 4.5 | 6.8 | 2.0 |
| C | 1.08 | 4.5 | 6.8 | 2.0 |
| D | 1.11 | 4.6 | 6.7 | 2.0 |
| E | 1.10 | 4.5 | 6.7 | 2.0 |
| F | 0.90 | 1.8 | 9.0 | 1.4 |
| G | 0.60 | 2.0 | 5.0 | 1.8 |

An electro-dynamic loudspeaker was manufactured as a woofer which was formed as a cone shaped vibrator member made of the combination B of the list above mentioned.

Figure 2:
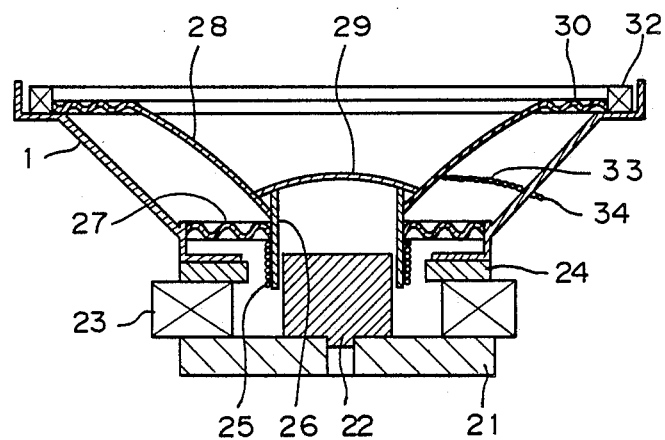
FIG. 2 is a cross sectional view of a loudspeaker using the vibrator member according to the present invention.

FIG. 2 shows the construction of this loudspeaker. A cylindrical pole-piece core 22 is disposed at the center of a circular back yoke plate 21. An annular field magnet 23 is disposed at the circumferential major surface of the back yoke plate 21. An annular pole-piece plate 24 is disposed on the field magnet 23. An annular magnetic gap is formed between the pole-piece core 22 and the pole-piece plate 24. A cylindrical and hollow bobbin 26 wound by a voice coil 25 is floatably inserted the magnetic gap. The bobbin 26 with the voice coil 25 is supported by an annular damper member 27. The center of the cone-shaped vibrator member 28 is connected to the end of the damper member 27 on Which a circular center cap member 29 is disposed. The opening circumference of the cone-shaped vibrator member 28 is supported by a cone-shaped housing frame 31 via an annular edge member 30. The edge member 30 is firmly fixed by an annular baffle gasket 32 to the housing frame 31. A lead wires 33 leading from the voice coil 25 are connected to connector terminals 34 disposed on the outside wall of the housing frame 31.

Figure 3:
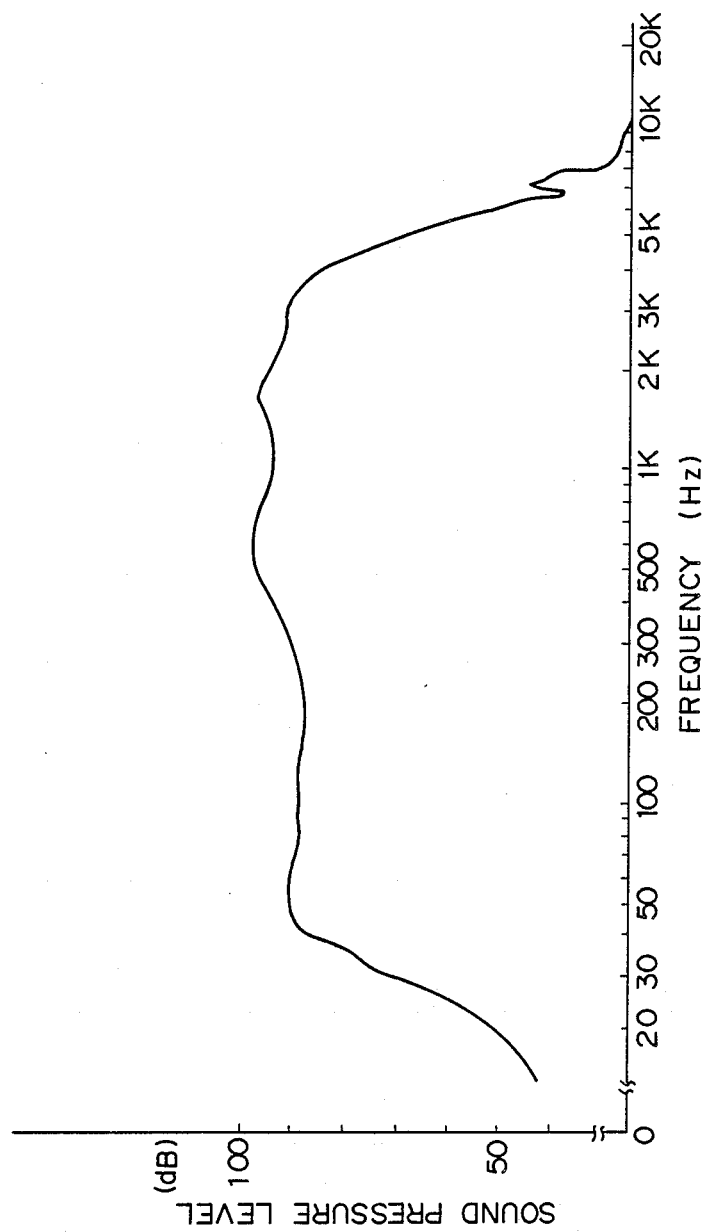
FIG. 3 is a graph showing a sound pressure vs. frequency characteristic of a loudspeaker using the vibrator member according to the present invention.

FIG. 3 shows a curve representing the responsiveness of this loudspeaker using the combination B to sound pressure in terms of frequency. The curve is a wide and flat responsive curve in the audio frequencies.

As described above, the vibrator member according to the present invention is capable of being freely colorable and has a glossy surface thereof while keeping the suitable physical properties for a vibrator member of a loudspeaker.

What is claimed is:

1. A vibrator member which comprises: a substrate sheet made of propylene resin with solid microparticles dispersed therein;
    a film made of a propylene resin for carrying a layer of ink presenting a printed visible pattern; and
    a layer of an adhesive interposed between one surface of said substrate sheet and a printed surface of said film.

2. A vibrator member according to claim 1, wherein said propylene resin is selected from a group consisting of polypropylene and propylene copolymers.

3. A vibrator member according to claim 2, wherein said propylene resin is ethylene-propylene copolymer.

4. A vibrator member according to claim 2, wherein said solid microparticles are selected from a group consisting of carbon fibers, graphite powders, mica powders, whiskers and the mixture thereof.

5. A vibrator member according to claim 4, wherein said printed visible pattern is printed through a printing method selected from gravure printing, letterpress printing and planography printing.

6. A vibrator member according to claim 1, wherein the thickness of said film is 20 through 300 $\mu$m and the thickness of said vibrator member is 0.1 through 1.0 mm.

7. A method of manufacturing a vibrator member which comprises the steps of:
    forming a continuous substrate sheet from a propylene resin with solid microparticles dispersed therein;
    forming a continuous film made of a propylene resin;
    printing a visible pattern on at least one surface of said continuous film with ink utilizing a printing method selected from one of gravure printing, letterpress printing, and planography printing to form a printed film;
    providing an adhesive between said one surface of said substrate sheet and a printed surface of said film;
    laminating said printed film to said substrate sheet to form an integrated sheet; and
    forming said integrated sheet into a predetermined shape of a vibrator member.

8. A method according to claim 7, wherein said propylene resin is selected from a group consisting of polypropylene and propylene copolymers.

9. A method according to claim 8, wherein said propylene resin is ethylene-propylene copolymer.

10. A method according to claim 8, wherein said solid microparticles are selected from a group consisting of carbon fibers, graphite powders, mica powders, whiskers or a mixture thereof.

11. A method according to claim 10, wherein said integrated sheet is formed through vacuum forming, compression molding or heating die molding by means of a die.

12. A vibrator member according to claim 3, wherein said solid microparticles are selected from a group consisting of carbon fibers, graphite powders, mica powders, whiskers and the mixture thereof.

13. A vibrator member according to claim 2, wherein the thickness of said film is 20 through 300 $\mu$m and the thickness of said vibrator member is 0.1 through 1.0 mm.

14. A vibrator member according to claim 3, wherein the thickness of said film is 20 through 300 $\mu$m and the thickness or said vibrator member is 0.1 through 1.0 mm.

15. A vibrator member according to claim 4, wherein the thickness of said film is 20 through 300 $\mu$m and the thickness of said vibrator member is 0.1 through 1.0 mm.

16. A vibrator member according to claim 5, wherein the thickness of said film is 20 through 300 $\mu$m and the thickness of said vibrator member is 0.1 through 1.0 mm.

17. A method according to claim 9, wherein said solid microparticles are selected from the group consisting of carbon fibers, graphite powders, mica powders, whiskers or the mixture thereof.

18. A vibrator member according to claim 1, wherein said adhesive is a urethane adhesive.

19. A method according to claim 7, wherein said adhesive is a urethane adhesive.

* * * * *